H. VIEDT.
ICE CREAM FREEZER.
APPLICATION FILED FEB. 18, 1907.
936,060.
Patented Oct. 5, 1909.
3 SHEETS—SHEET 2.
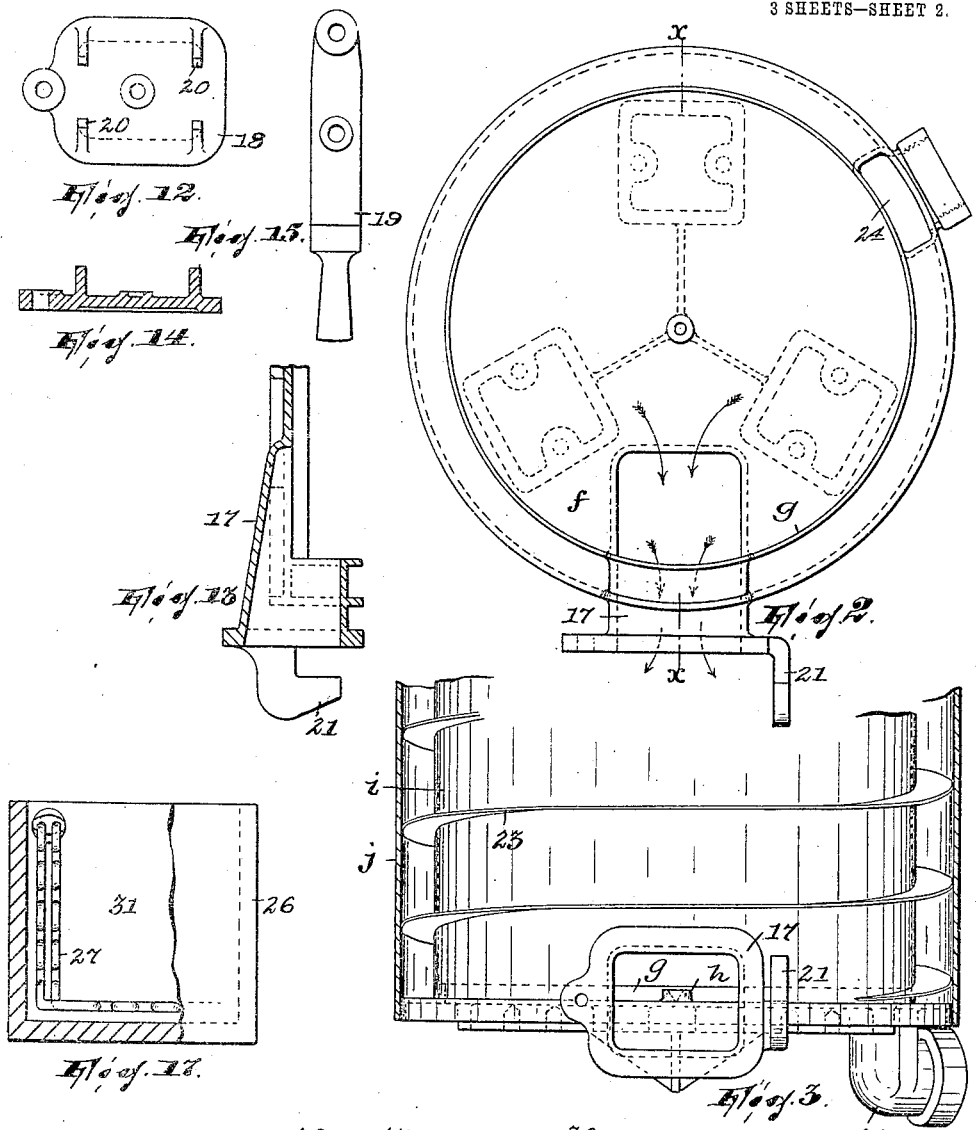
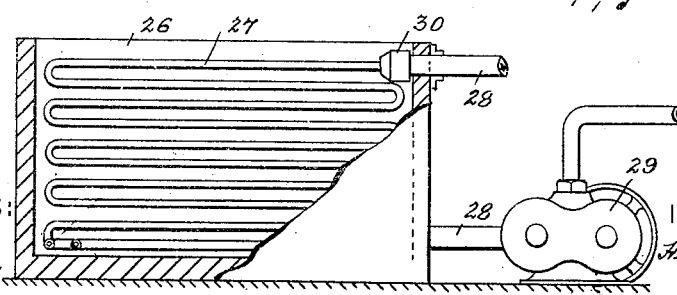
WITNESSES:
Wm Dzell
A. Glatt
INVENTOR
Hermann Viedt,
BY
Gartner Seward,
ATTORNEYS.

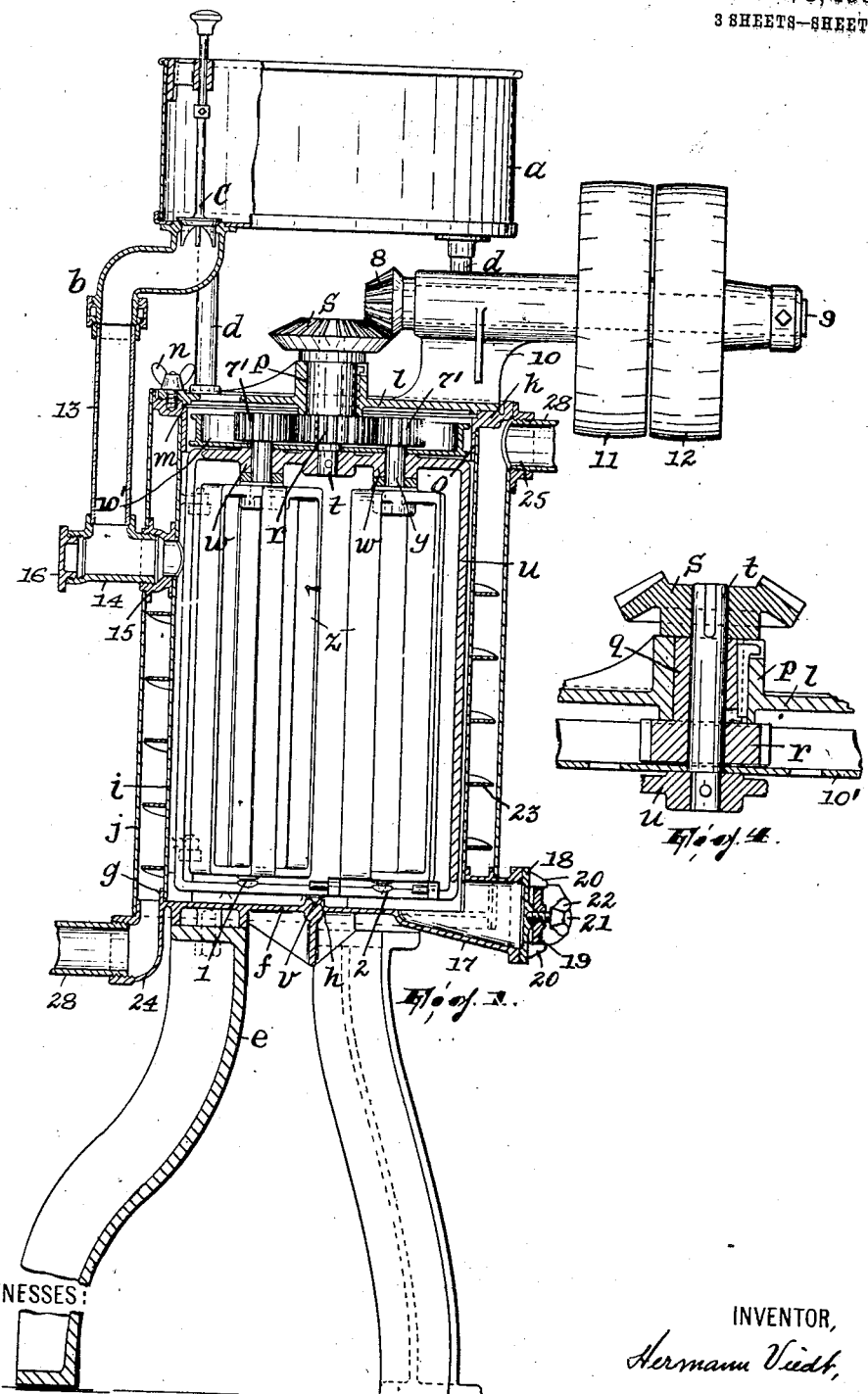

H. VIEDT.
ICE CREAM FREEZER.
APPLICATION FILED FEB. 18, 1907.
936,060.
Patented Oct. 5, 1909.
3 SHEETS—SHEET 3.
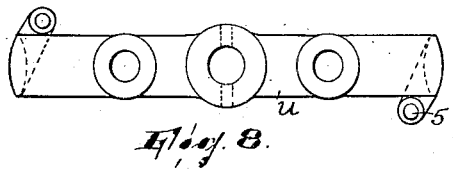
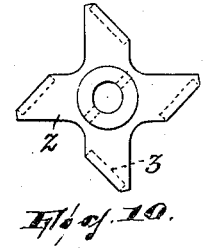
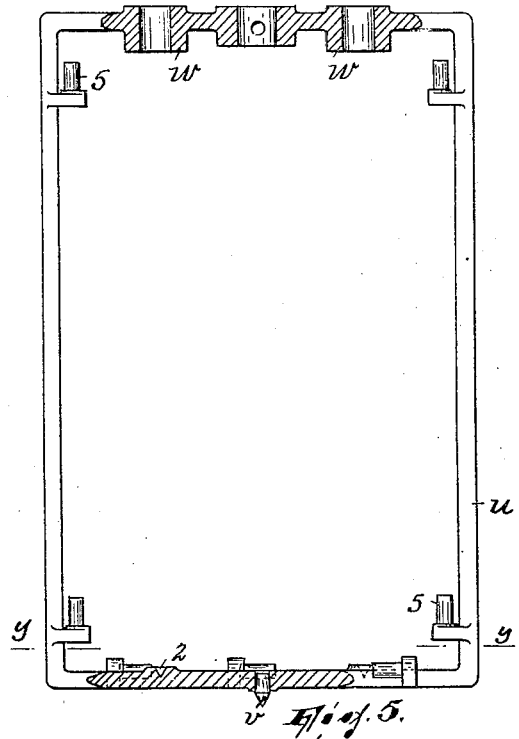
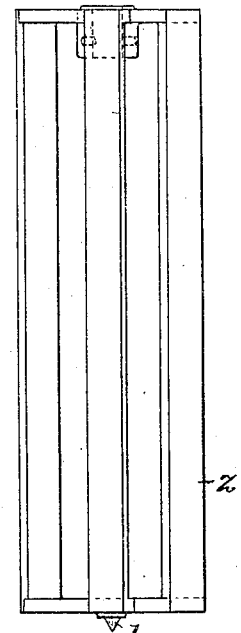
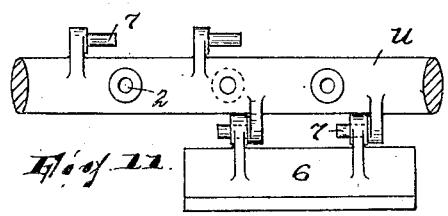
WITNESSES:
Wm. D. Bell.
A. Glatt.
INVENTOR,
Hermann Viedt,
BY
Arthur Luvard,
ATTORNEYS.

UNITED STATES PATENT OFFICE.

HERMANN VIEDT, OF MORRISTOWN, NEW JERSEY.

ICE-CREAM FREEZER.

936,060.

Specification of Letters Patent.

Patented Oct. 5, 1909.

Application filed February 18, 1907. Serial No. 357,817.

*To all whom it may concern:*

Be it known that I, HERMANN VIEDT, a citizen of the United States, residing in Morristown, Morris county, New Jersey, have invented certain new and useful Improvements in Ice-Cream Freezers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention relates to machines for freezing liquids, as in the making of ice-cream, wherein the liquid is designed to leave said medium in a semi-solid condition, to be afterward completely solidified in molds in separate apparatus. Its principal object is to provide a machine in which the freezing may be accomplished with a material economy in point of labor, time and materials over machines at present in use, which machine shall be furthermore easy to operate, simple and compact in construction and capable of being kept in a clean and sanitary condition.

My invention will be found fully illustrated in the accompanying drawings, wherein, Figure 1 is a vertical sectional view of substantially the whole of the machine on line $x$—$x$ of Fig. 2, the section being (falsely) made to include a certain brine inlet port; Fig. 2 is a plan view of the base of the cylinder for the materials to be frozen; Fig. 3 is a view showing the lower portion of the apparatus, the outer cylinder being in section and the inner in elevation; Fig. 4 is a sectional view of certain gearing; Figs. 5 to 7 are detail elevations of the agitating or beating mechanism; Figs. 8 to 10 are projected plan views of what are shown in Figs. 5 to 7, respectively; Fig. 11 is a sectional view on line $y$—$y$ of Fig. 5; Figs. 12 to 15 are detail views of the cream-discharge outlet or spout; and, Figs. 16 and 17 illustrate the means for supplying a cooling agent to the machine.

In the present machine, as in that covered by my application for U. S. Letters Patent Serial Number 297,083, the machine carries a superposed supply hopper for the materials to be frozen and from this hopper the materials descend into the upper part of the apparatus wherein they are brought to the desired state of semi-solidity to be discharged therefrom at the bottom. Accordingly, $a$ is the hopper and $b$ a pipe leading downwardly therefrom, the flow therethrough being regulated by a suitable valve $c$; the hopper is supported on several legs $d$, in turn resting on the cap-piece or ring $k$ of the apparatus, hereinafter described.

The apparatus itself rests on three or more legs $e$, the part immediately resting on said legs being a base or base-plate $f$ bolted to the legs and having a continuous marginal flange $g$ on its top surface and a central bearing socket $h$. Resting on this base-plate and arranged the one to take inside of the said flange $g$ and the other outside of the base-plate itself are two concentric cylinders $i$, $j$, respectively. These two cylinders are capped by a ring $k$ in turn supporting a cover-plate $l$ which has an underneath flange $m$ closely fitting the ring so as to prevent lateral movement of the cover-plate, which is further secured to the ring by thumb-screws $n$, one of which is seen in Fig. 1; the cylinder $i$ may take against the outside of a flange $o$ on ring $k$ and cylinder $j$ against the outside of the ring itself.

The cover-plate is formed with a central hollow boss $p$ in which is keyed the sleeve $q$ of a stationary pinion $r$. This pinion and the boss afford a bearing for a bevel-pinion $s$ whose shaft $t$ penetrates the pinion $r$ and has pinned or otherwise fixed to its lower end (to revolve therewith) the top of a rectangular frame $u$ having a cone-bearing $v$ stepped in the socket $h$ and alined with shaft $t$. This frame, which is to some extent itself a part of the agitating or beating mechanism, has in its upper part two bearings $w$ for the shafts $y$ of agitators or beaters $z$ having cone-bearings 1 stepped in bearing sockets 2 disposed in the bottom of frame $u$ in alinement with the bearings $w$; the beaters $z$, which are constructed as best shown in Figs. 7 and 10, have their acting faces 3 standing at an acute angle to the direction of movement around the axis on which the particular agitator turns so as to heighten the beating action as much as possible. Pivoted blades 4 are attached to the studs 5 on the vertical sides of frame $u$ and, by the resistance of the material, are held against the inside of the cylinder $i$, acting as scrapers to keep the wall of said cylinder clear of freezing material; similar blades 6 pivoted on studs 7 at the bottom of frame $u$, perform a similar function on the base-plate $f$. These blades 4 and 6 are set on opposite sides, in each instance, of the frame $u$.

The shafts $y$ of the beaters carry pinion $7'$ meshing with pinion $r$, while the bevel-pinion $s$ meshes with a bevel-pinion 8 on a shaft 9 journaled in a bracket 10 integral with the cover-plate $l$; said shaft carries fast and loose pulleys 11 and 12. The result is that when shaft 9 is driven its motion is transmitted through the bevel pinions to shaft $t$ which, rotating the frame $u$, causes the pinions $7'$ to travel around pinion $r$ and be rotated thereby according to the well known planetary movement; so that as the entire agitating mechanism revolves, each beater or agitator revolves on its own axis within it. This imparts a very high state of agitation to the materials being frozen and very appreciably hastens the process, as must be apparent to those skilled in the art.

In order to prevent the cream from working up into the pinions, a shallow cup-shaped fender $10'$, penetrated by the shafts $t$ and $y$, is carried by the frame $u$ under the pinions $r$ and $7'$ and approximates very nearly the inside diameter of the inner receptacle so as to very effectually isolate the gearing from the cream.

The pipe $b$ comprises the section 13, whereby connection is made with a fitting 14 connected with cylinder $i$ by a union 15; 16 is a cap for fitting 14 which may be removed for the purpose of clearing the passage should the materials freeze or clog therein; this cap may be of glass, if desired, so as to permit visual inspection of the operation going on in cylinder $i$.

The base-plate $f$ is formed with an integral spout 17 constructed substantially as shown in Figs. 1 and 12, whereby its capacity is very considerable, and pivoted at its mouth, having a flat surface around it, is a valve 18 and a handle 19, said valve having on its outer face lugs 20 between which the handle extends so that the valve and handle move together.

21 is a hook into which the handle catches when the valve is closed, and 22 is a set-screw mounted in the handle and adapted to bear against the valve so that, when the valve is in the closed position, the screw may be employed to jam the inner flat face of the valve tightly against the flat face at the mouth of the spout. Furthermore, the spout being internally of rectangular form (Fig. 3), the right-hand lower corner portion thereof may be made to coact with the valve, which has a relatively upward movement, to regulate to a nicety just the size of the cream flow which issues; so that small molds as well as large may be filled in a manner calculated to avoid overflowing and spilling.

The cooling medium, preferably cold brine, is circulated around the cylinder $i$, and for this purpose a spiral partition 23 is introduced between the cylinders $i$ and $j$. The brine enters the space occupied by this partition through a union 24 cast integral with the base-plate $f$ and, after being caused to circulate around the cylinder $i$ by the spiral partition 23 it leaves said space at the top through the port 25. The construction of this partition and the manner in which it is arranged between the two receptacles is comparatively inexpensive and, besides, leaves the portions of the wall of the inner receptacle between the helices of the partition clear or exposed directly to the circulating liquid.

Figs. 16 and 17 show a tank or chest 26 containing a coil 27 forming a part of a system of piping 28 which is connected on the one hand with the union 24 and on the other with the port 25; 29 is a pump to keep the brine circulating. In order to increase the cooling surface of the coils in the chest 26, two or more of such coils are connected by a reducer 30 with the exterior portion of the system of piping and the coils are preferably arranged along one or both sides of the chest 26 and the bottom, leaving a space 31 for the reception of a block of ice.

In the operation of the apparatus the materials to be frozen are placed in hopper $a$ and, the shaft 9 being driven, thereby causing the frame $u$ to rotate and the agitators to also rotate in said frame, as described, the said materials, after being admitted to the receptacle formed by cylinder $i$, base-plate $f$ and the cover structure from the hopper by opening valve $c$, are thoroughly agitated. Meanwhile the pump 29 is operated to drive the brine through the system of piping 28 and through the receptacle formed by cylinder $j$, the base-plate and the cover structure. The brine enters the latter receptacle at the bottom and, by virtue of the partition 23, travels spirally upward around the inner receptacle, leaving at the port 25 whereupon, its temperature having been slightly raised, it is returned to the coil 27 for recooling. When the desired condition of solidity has been reached, the thumb-screw 22 is loosened, thereby permitting the valve 18 to be raised by handle 19 so that the frozen material may be discharged through the spout into a suitable receptacle for that purpose; in order to assist the discharge, the agitating mechanism may be kept in motion.

In the machine illustrated in my co-pending application above referred to, the cream enters the freezing receptacle from the hopper through a central shaft carrying the agitating means; this construction I have found to be somewhat impracticable for all purposes inasmuch as, if the cream is charged with fruits, the way through the shaft is likely to become clogged, and it is not advisable to make the shaft of sufficiently large diameter to overcome this difficulty. In the present instance, therefore, the pipe leading from the hopper enters the receptacle *i* at the side thereof, thereby enabling me to make the pipe large enough so that fruit-containing materials can pass therethrough without clogging and leading to the possibility of providing means whereby the proper filling of the receptacle can be ascertained although the machine is normally a closed one.

Having thus fully described my invention, what I claim as new and desire to secure by Letters Patent is:

1. In an ice cream freezer or the like, the combination, with a cylindrical receptacle for the material to be frozen, a cover therefor having a central hollow boss, a pinion having a hub extending up into and fixed in said boss, a shaft journaled in said pinion axially thereof and extending up through the boss, means for rotating said shaft having a portion thereof supported by the cover, a frame carried by said shaft and arranged in said receptacle, agitators journaled in said frame and pinions carried by said agitators and meshing with said first-named pinion, substantially as described.

2. In an ice-cream freezer or the like, the combination of a receptacle for the material to be frozen, an agitating mechanism arranged in said receptacle, means for supplying the materials to be frozen to the receptacle, and a tubular spout for the discharge of the frozen materials, said spout and the opening from the receptacle affording communication therewith being extended under the bottom and up the side of the receptacle, substantially as described.

3. The combination, with a discharge spout having a substantially angular formation in the lower inside portion thereof and a flat face around its mouth, of a valve having a flat face adapted to bear against the flat face of the spout, said valve being movable relatively upwardly in a plane parallel with the plane of the spout, substantially as described.

4. In an ice cream freezer or the like, the combination, with a receptacle for the materials to be frozen, of an agitating means inclosed in said receptacle, a discharge outlet for the receptacle, a hopper located above the receptacle, a valved pipe leading from the hopper to the side of said receptacle near the top thereof and discharging into said receptacle, and a removable cap arranged in the pipe in alinement with its discharge end, the space of said pipe between its discharge end and the cap being straight and free or clear, substantially as described.

In testimony, that I claim the foregoing, I have hereunto set my hand this 14th day of February, 1907.

HERMANN VIEDT.

Witnesses:
JOHN W. STEWARD,
WM. D. BELL.